United States Patent [19]

Wycoff

[11] 3,866,124

[45] Feb. 11, 1975

[54] COMMUNICATION SYSTEM INCORPORATING SIGNAL DELAY

[76] Inventor: Keith H. Wycoff, 1205 N. Tyler St., Lexington, Nebr. 68850

[22] Filed: June 21, 1973

[21] Appl. No.: 372,250

[52] U.S. Cl. ..................... 325/55, 325/64, 325/155, 340/171 PF

[51] Int. Cl. ............................................ H04b 5/04

[58] Field of Search ...... 340/171 R, 171 A, 171 PF, 340/345, 351; 331/179; 179/41 A, 15 BA, 15 BZ, 15 BV; 325/55, 64, 392, 466; 317/147

[56] References Cited

UNITED STATES PATENTS

| | | | |
|---|---|---|---|
| 3,204,045 | 8/1965 | Tuthill et al. | 325/55 X |
| 3,320,535 | 5/1967 | Broadhead Jr. | 325/64 |
| 3,482,049 | 12/1969 | Kobayashi et al. | 179/15 BA |
| 3,581,208 | 5/1971 | Buehrle Jr. et al. | 325/64 |
| 3,613,004 | 10/1971 | Wycoff | 325/55 |

*Primary Examiner*—Benedict V. Safourek
*Attorney, Agent, or Firm*—Prangley, Dithmar, Vogel, Sandler & Stotland

[57] ABSTRACT

The system includes a transmitter which transmits a sequence of tones. The receiver in the system has a processing circuit to detect the tones. The sequence of tones itself and also a delayed sequence of tones are applied to a mixer, which provides a mixed signal with a frequency representative of the difference between tones in the sequence.

33 Claims, 13 Drawing Figures

PATENTED FEB 11 1975 SHEET 1 OF 7 3,866,124
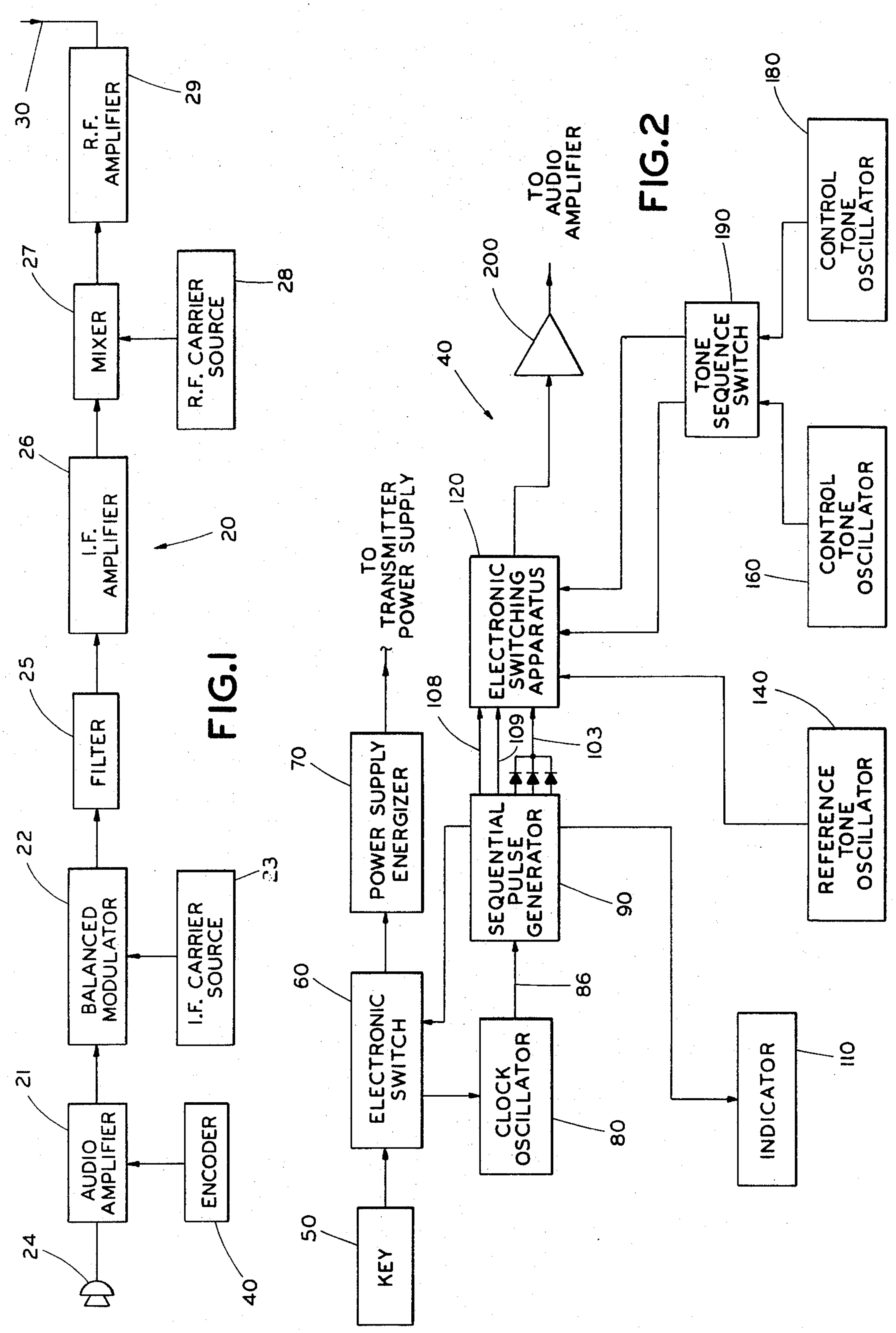
FIG. I FIG. 2

COMMUNICATION SYSTEM INCORPORATING SIGNAL DELAY

BACKGROUND OF THE INVENTION

A selective call communication system comprises a transmitter and a number of receivers. Each receiver is responsive to the same carrier wave frequency, but is responsive to a predetermined tone or set of tones. If the system is of the paging variety, a given receiver will emit an alerting signal, such as light and/or sound, in response to a carrier wave modulated with the associated tone or set of tones. The possessor of such a receiver will then perform some previously agreed upon action such as calling his office. Different sets of tones modulated on that carrier wave will activate other receivers. In a system capable of communicating by voice, each receiver's audio circuitry will be squelched until the associated tone or set of tones is received. At that time the receiver becomes unsquelched and then reproduces sound communication thereto.

In certain types of communication systems, there is a tendency for the frequencies of tones detected in the receiver to be different from the frequencies of the tones originally generated in the transmitter. This occurs, for example, in single side-band systems wherein the carrier wave and one of the side bands of an amplitude-modulated signal have been suppressed. The carrier wave is reinserted at the receiver by means of local oscillators. Any disparity between the reinserted carrier wave and the original carrier wave will result in a variation in the frequencies of the detected tones. Also, there may be a variance in the detected frequencies for other reasons. The detected frequencies may be sufficiently in error not to operate the selected receiver.

One system for overcoming these difficulties has been disclosed in U.S. Pat. No. 3,771,060. In that patent, the system involved the transmission of simultaneous tones, both of which have a tendency of shift by a corresponding amount, so that the difference therebetween remains constant. However because tones of two different frequencies were simultaneously transmitted, the detected signals could not be limited or clipped.

SUMMARY OF THE INVENTION

It is therefore, an important object of the present invention to provide a communication system which is relatively insensitive to variations in frequency of the transmitted tones.

Another object is to provide a communication system in which the tones detected in the receiver can be limited, so that their amplitude remains constant.

Still another object is to provide an improved system for transmitting and receiving data.

In summary, there is provided a communication system comprising a transmitter including means for generating a sequence of a reference tone and at least one control tone, and means for transmitting the sequence of tones; and a receiver including a processing circuit for receiving the transmitted signals and providing an undelayed sequence of tones, delay means coupled to the processing circuit for providing a delayed sequence of tones, the delay being such as to cause the reference tone in one sequence to be in time coincidence with at least a portion of the one control tone in the other sequence, mixing means having two inputs respectively coupled to the processing circuit and to the delay mans for mixing the undelayed sequence and the delayed sequence, whereby a mixing means provides a low-frequency mixed signal having a frequency representative of the difference between the frequencies of the reference tone and the control tone, and utilization means coupled to the decoding means for using the mixed signal.

In another form of the invention, the transmitter includes a carrier-wave generator, a modulator for modulating a sequence of tones onto the carrier wave, a power supply for energizing the carrier-wave generator and the modulator, and an encoder for generating the sequence of tones, the encoder comprising a manually operable actuator, an electronic switch coupled to the actuator and responsive to actuation thereof for producing an enabling signal extending indefinitely beyond release of the actuator, the power supply being coupled to the electronic switch and responsive to the enabling signal therefrom to produce power for energizing the carrier-wave generator and the modulator, a clock oscillator coupled to the electronic switch and responsive to the enabling signal therefrom for producing an oscillatory signal, a sequential switch having a control input coupled to the electronic switch and having a plurality of tone inputs and a tone output and a reset output, the sequential switch being responsive to an oscillatory signal on the control input sequentially to couple the tone inputs to the tone output, the sequential switch further being responsive to the last tone input being coupled to the tone output to produce a reset signal on the reset output, the electronic switch being coupled to the reset output and being responsive to the reset signal therefrom to interrupt the enabling signal, and a plurality of tone oscillators respectively coupled to the tone inputs of the sequential switch.

The invention consists of certain novel features and a combination of parts hereinafter fully described, illustrated in the accompanying drawings, and particularly pointed out in the appended claims, it being understood that various changes in the details of the circuitry may be made without departing from the spirit of sacrificing any of the advantages of the invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its mode of construction, assembly and operation, and many of its advantages should be readily understood and appreciated.

FIG. 1 illustrates a block diagram of the transmitter used in a selective call communication system incorporating the features of the present invention;

FIG. 2 is a block diagram of the encoder so labeled in FIG. 1;

DESCRIPTION OF THE PREFERRED EMBODIMENT

Figure 3A:
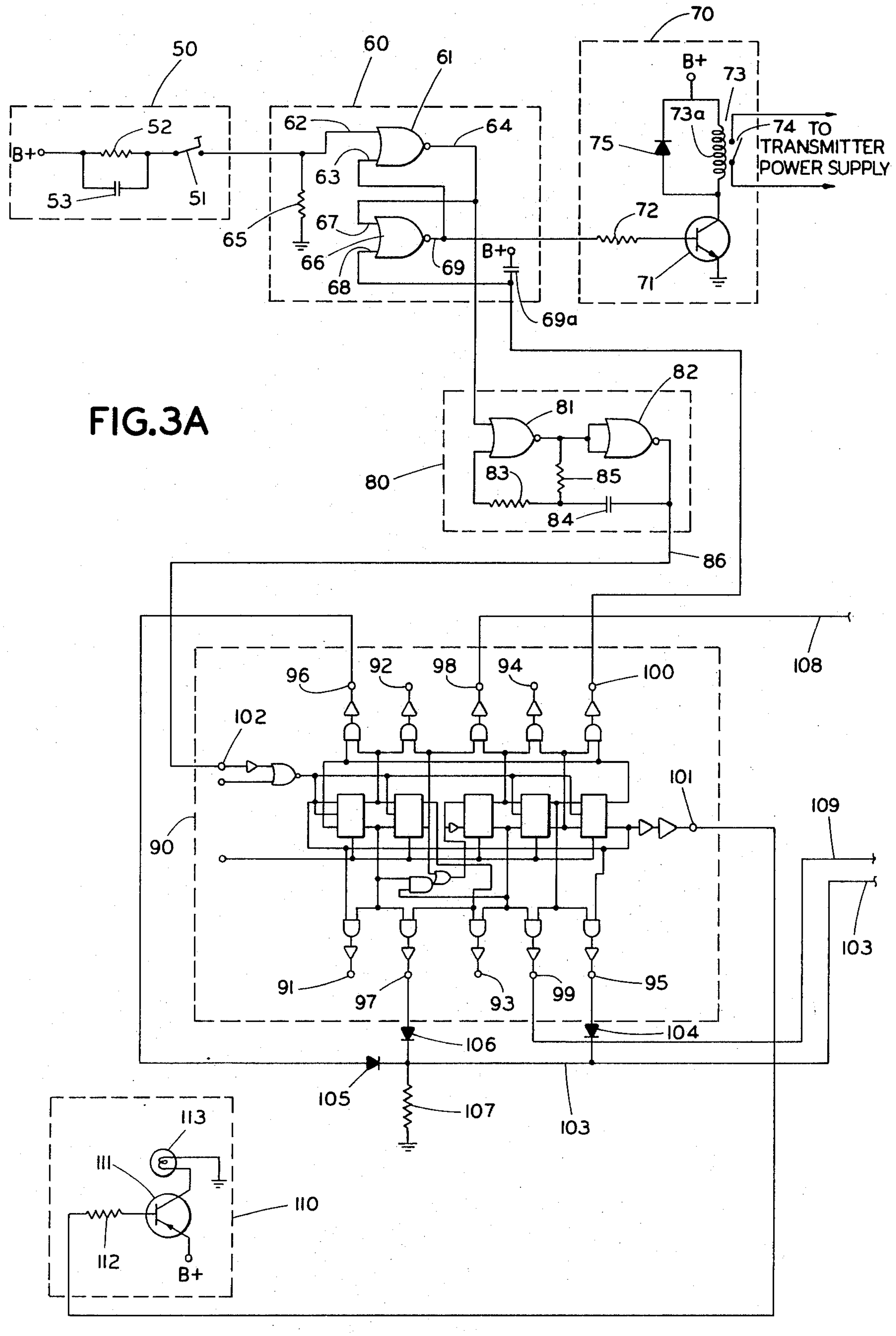
FIGS. 3A and 3B illustrate the details of the encoder partially in block and partially in schematic.

Referring now to the drawings, and more particularly to FIG. 1 thereof, there is shown a single side-band transmitter 20 for transmitting single side-band signals with a suppressed carrier. The transmitter 20 includes an audio amplifier 21 for applying an audio signal to a balanced modulator 22, the modulator 22 having a second input to which is applied an IF carrier derived from an IF carrier source 23. The balanced modulator 22 mixes the aduio signal (the modulation frequencies) and the oscillatory signal (the carrier wave), and passes the sum and difference frequencies. The modulation frequencies are attenuated substantially because of the band-pass characteristics of the modulator 22, and the carrier wave is balanced out electronically. The modulation components may either be in the form of a voice message applied to the audio amplifier 21 by way of the microphone 24 or from an encoder 40 to be described in detail hereinafter.

The upper and lower side bands produced in the balanced modulator 22 are applied to a filter 25 which passes only a selected one of the side bands, the selected side band being amplified in an IF amplifier 26. The amplified IF signal is applied to a mixer 27 which also receives a higher frequency, RF carrier from an RF carrier source 28, thereby to provide a modulated signal at radio frequencies. The RF signal is amplified in a tuned RF amplifier 29 and is radiated by an antenna 30. The elements just described are elements well-known in the art, so that further description thereof is unnecessary. Also, it is to be understood that a single side-band transmitter is merely exemplary. A system incorporating the principles of the present invention can also be AM or FM. Also, the principles are applicable to other than selective call systems; for example, the invention described herein may be used in data transmission and reception.

Referring now to FIG. 2, there is shown a block diagram of the encoder 40. The encoder 40 includes a manually operable actuating key 50 connected to an electronic switch 60. When the key 50 is actuated, the electronic switch 60 latches on and produces an enabling signal that extends indefinitely beyond release of the key 50. The electronic switch 60 is coupled to a power-supply energizer 70, which energizer 70 is responsive to the enabling signal to energize the power supply of the transmitter. The power supply (not shown) supplies power to the various elements of the transmitter 20 illustrated in FIG. 1, thereby causing it to generate the carrier wave onto which the tones will be modulated.

Another output of the electronic switch 60 is coupled to a clock oscillator 80 which produces an oscillatory signal in the form of a series of pulses. The oscillatory signal is coupled to the control input of a sequential pulse generator 90 which, in response to the oscillatory signal, produces a sequence of pulses respectively on a plurality of outputs of the generator 90. A pulse appears on the conductor 103; thereafter, a pulse appears on the conductor 108; and, thereafter, a pulse appears on the conductor 109. The sequential pulse generator also has a reset output which is coupled back to the electronic switch 60. The sequential pulse generator 90 has a further output which is coupled to an indicator 110 which causes an alerting signal, either audio or visual, to be produced during the time the pulses appear on the conductor 103, 108 and 109. The indicator 110 apprises the operator of the transmitter 20 that a sequence of tones is being transmitted. On termination of the last pulse, a reset signal is produced on the reset output. The electronic switch 60 has an input coupled to such reset output and is responsive to the reset signal therefrom to interrupt the enabling signal being applied to the power-supply energizer 70 and the enabling signal being applied to the clock oscillator 80. Accordingly, such reset signal interrupts the carrier wave and also causes the oscillatory signal from the clock oscillator 80 to cease.

The three conductors 103, 108 and 109 are coupled to electronic switching apparatus 120 which also has three tone inputs and a tone output. The encoder 40 includes a reference tone oscillator which produces a reference tone for coupling to one of the tone inputs of the electronic switch apparatus 120. A control tone oscillator 160 and a control tone oscillator 180 are coupled to a tone sequence switch 190, the outputs of which are respectively coupled to the other tone inputs of the electronic switching apparatus 120. The electronic switching apparatus 120 is responsive to the first pulse on the conductor 103 to couple the reference tone from the oscillator 140 to the amplifier 200. Thereafter, the pulse on the conductor 108 causes the control tone from the oscillator 160 to be coupled to the amplifier 200. Finally, the pulse on the conductor 109 causes the control tone from the oscillator 180 to be coupled to the amplifier 200. As long as the encoder 40 is operative, the tone oscillators 140, 160, and 180 produce their respective tones, whereby the signal applied to the amplifier 200 comprises a reference tone produced by the reference tone oscillator 140 followed by a sequence of control tones respectively produced by the oscillators 160 and 180. If the tone sequence switch 190 were reversed, the sequence of control tones would be similarly reversed. Thus, actuation of the key 50 causes the encoder 40 to generate a reference tone followed by a sequence of control tones. Actuation of the key 50 also causes the transmitter 20 to produce a carrier wave and to modulate the sequence of tones (including the reference tone and the control tones) on the carrier wave. The indicator 110 produces an alerting signal while the sequence of tones is being translated. After the alerting signal is interrupted, signifying completion of the sequence of tones, the operator can speak into the microphone 24 (FIG. 1).

Turning now to FIG. 3A, details of certain of the elements illustrated in block in FIG. 2 will be described. The key 50 includes a manually operable switch 51 which has a normally open condition. The switch 51 is coupled through a capacitor 53 to a B+ supply voltage. A resistor 52 is coupled in parallel with the capacitor 53 for discharging same.

The electronic switch 60 includes a first NOR gate 61 having one input 62 coupled to the switch 51, and having a second input 63 and an output 64. A biasing resistor 65 is coupled between the first input 62 and ground reference potential. There is also provided a second NOR gate 66 having a pair of inputs 67 and 68 and an output 69. The output 69 of the second NOR gate 66 is coupled to the input 63 of the first NOR gate 61, and the output 63 of the first NOR gate 61 is coupled to the first input 67 of the second NOR gate 66, thereby to intercouple the NOR gates 61 and 66 regeneratively. Using standard nomenclature, a NOR gate will produce a "0" output signal when both input signals are "1" or when either input is "1." The only time a NOR gate will produce a "1" output signal is when both input signals are "0". Initially, the input signals to the inputs 62 and 63 of the NOR gate 61 are both "0," so that the output signal is " 1." Thus the input signal to the input 67 of the second NOR gate 66 is "1," and the input signals to the second input 68 is "0," so that the output signal at the output 69 is also "0." When the switch 51 is actuated, to apply a trigger pulse through the capacitor 53, a "1" is provided at the input 62, thereby producing a "0" at the output 64 and a "0" at the input 67. A "1" will appear at the output 69, thereby regeneratively turning on the electronic switch 60. After the switch 51 is released, a "0" is applied to the input 62, but a "1" from the second NOR gate 66 which is applied to the input 63, maintains a "0" at the output 64 and the input 67, and maintains a "1" at the output 69 and the input 63. The "0" at the output 64 and the "1" at the output 69 constitute enabling signals as will be described. Because of the regenerative connections, the switch 60 is latched on until it is reset, as described hereinafter. A capacitor **69*a* is coupled from the B+supply voltage to the second input 68 of the NOR gate 66 to prevent the electronic switch 60** from triggering when the B+ supply voltage is first turned on.

The power supply energizer 70 includes an NPN transistor 71 having its emitter coupled to ground reference potential, and its base coupled through a resistor 72 to the output 69 of the electronic switch 60. The collector of the transistor 71 is coupled by way of the winding **73*a* of a relay 73 to the B+ supply voltage. The relay 73 has a pair of contacts 74 coupled to the transmitter power supply. Also, a diode 75 is coupled in parallel with the winding 73*a*. In the stand-by condition of the electronic switch 60, a "0" is produced at the output 69 and the transistor 71 is not operable. However, when the switch 51 is operated, to produce a "1" at the output 69, current is caused to flow through the transistor 71, thereby energizing the winding 73*a* and closing the contacts 74. The power supply is, therefore, rendered operative to produce power for energizing the transmitter 20 as previously explained. The diode 75 prevents the back emf caused by the inductance in the winding 73*a* from damaging the transistor 71.**

The oscillator 80 includes a pair of NOR gates 81 and 82 connected in cascade. One input of the NOR gate 81 is coupled to the output 64 in the electronic switch 60, and the second input of the NOR gate 82 is coupled by way of a resistor 83 and a capacitor 84 to the output of the NOR gate. The two inputs of the NOR gate 82 are coupled together and to the output of the NOR gate 81. A resistor 85 is coupled to the juncture of the resistor 83 and the capacitor 84 and to the juncture of the NOR gates 81 and 82. A conductor 86 is coupled to the output of the NOR gate 82, which constitutes the output of the oscillator 80. When the electronic switch 60 is in its stand-by condition, producing a "1" at the output 64, the oscillator 80 is not operative. When the switch 51 is actuated to cause a "0" to appear on the output 64, the oscillator 80 responds thereto to produce an oscillatory signal on the conductor 86. The oscillatory signal takes the form of a series of pulses which are produced as long as there is a "0" on the output 64. The frequency of the oscillatory signals produced on the conductor 86 is determined by the values of the resistors 83 and 85 and the capacitor 84. In one construction of the invention, the NOR gates 61, 66, 81 and 82 came in the same package made by Solid State Scientific, Inc., No. SCL 4001A, entitled "Low Power CMOS NOR Gates."

The sequential pulse generator 90 produces a sequence of a plurality of pulses respectively at a plurality of outputs in response to the application thereto of a pulsating signal. An example of a suitable sequential pulse generator is made by Solid State Scientific, Inc., No. SCL4017A under the title "CMOS Decade Counter-Divider." Such sequential pulse generator 90 has a set of 10 outputs 91–100, the second digit of each of which bears a number representative of the order in which the pulses are produced. In other words, the first pulse appears on the conductor 91, the second on the conductor 92. . ., the tenth on the conductor 100. The generator 90 has a further output 101 on which there is produced a delayed pulse for purposes to be described hereinafter. The generator also has an input 102 which is coupled to the conductor 86 to receive the oscillatory signal from the clock oscillator 80. The generator 90 has other inputs which are not used in the instant system and therefore are not identified with reference numbers.

Figure 4:
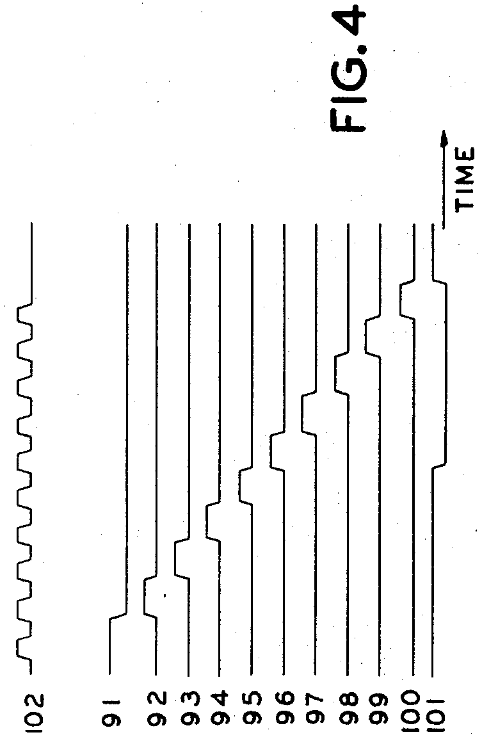
FIG. 4 illustrates wave forms applied to and produced by the sequential pulse generator forming part of the encoder.

The outputs 95, 96, and 97 are coupled to a common conductor 103 respectively by means of decoupling diodes 104, 105, and 106, a resistor 107 being coupled between the conductor 103 and ground reference potential. Referring to FIG. 4, the mode of operation of the generator 90 will be described. The wave forms are identified by reference numbers corresponding to the input and output reference numbers of FIG. 3A. Thus, the oscillatory signal from the oscillator 80, in the form of a series of pulses, appears at the input 102. The first pulse in such oscillatory signal causes a pulse to appear at the output 91, the second pulse causes a pulse to appear on the output 92. . ., the tenth pulse in the oscillatory signal producing a corresponding pulse on the output 100. In addition, there appears on the input 101 a reverse-polarity pulse, commencing with the initiation of the sixth pulse which appears on the output 96, and terminating with the end of the tenth pulse which appears on the output 100. The pulses appearing on the outputs 91–94 are not used. A long pulse, defined by the pulses on the outputs 95, 96, and 97, appears on the conductor 103, which long pulse is delayed from the commencement of the oscillatory signal on the input 102. The eighth pulse from the output 98 appears on the conductor 108, and the ninth pulse from the output 99 appears on the conductor 109. Thus, in the particular form illustrated, the duration of the pulse on the conductor 103 is three times the duration of the pulse on the conductor 108 and the pulse on the conductor 109. The entire sequence of pulses is delayed for an interval equal to the combined durations of the pulses in the outputs 91–94. Such delay permits the transmitter to begin producing a carrier wave before the tone sequence begins.

The output 101 is coupled to an indicator 110, which includes a PNP transistor 111 having its base coupled through a resistor 112 to the input 101. The emitter of the transistor 111 is coupled to the B+ supply voltage, and the collector is coupled to ground through a lamp 113. The extended pulse on the output 101 causes the transistor to conduct and therefore illuminate the lamp 113. Since the duration of such extended pulse encompasses the duration of the pulses on the conductors 103, 108, and 109, the lamp 113 will be illuminated for the entire time the generator 90 is producing an output.

Figure 3B:
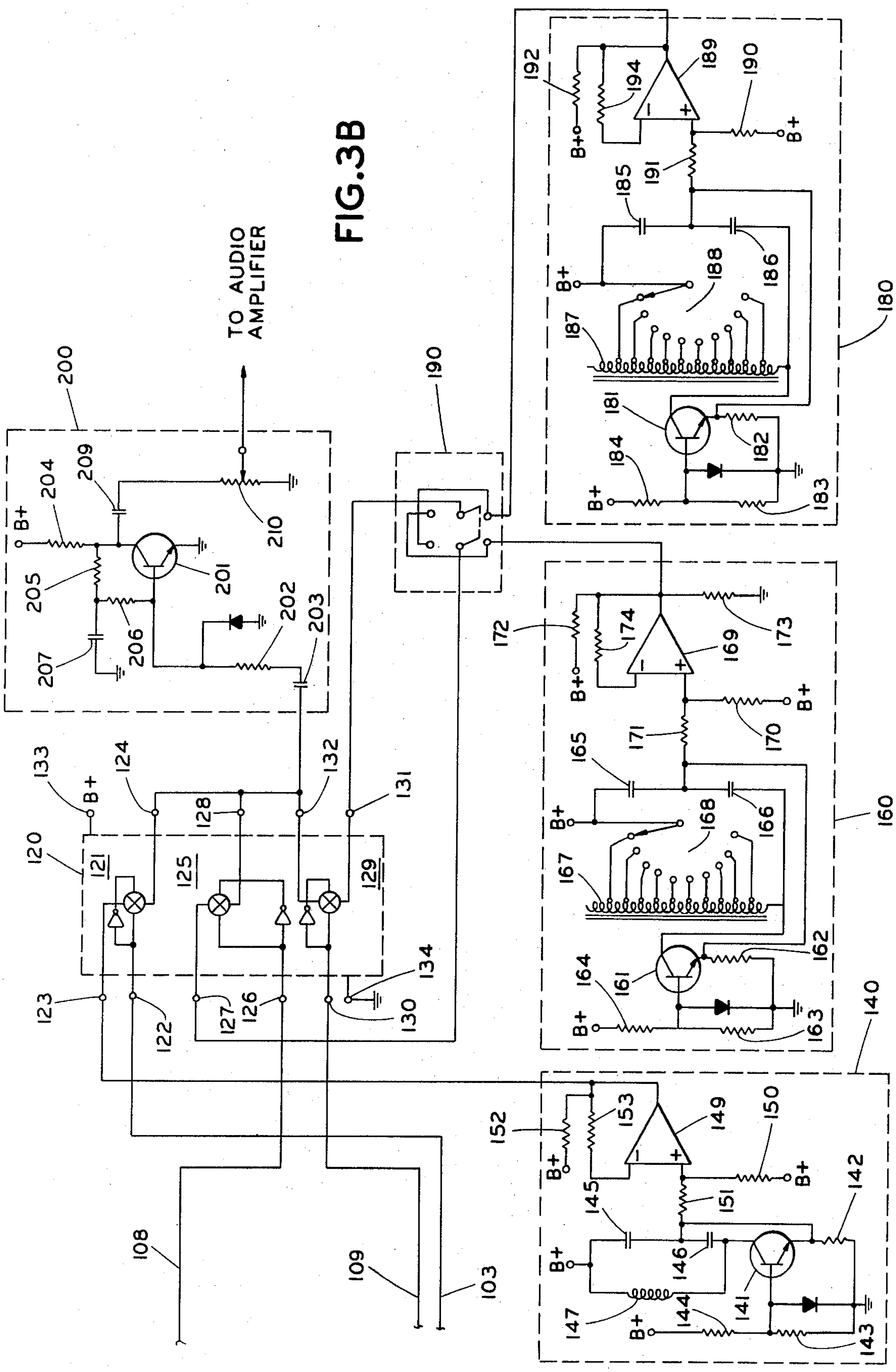
Figure 5:
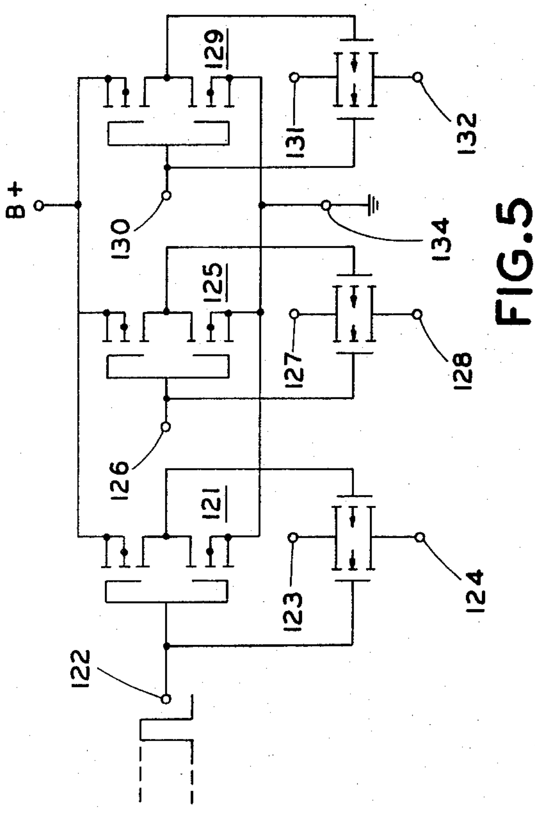
FIG. 5 is a schematic diagram of the electronic switching apparatus forming part of the encoder.

Turning to FIG. 3B, further details of the encoder 40 will be described. The conductors 103, 108, and 109 are coupled to electronic switching apparatus 120. The switching apparatus 120 includes three bilateral switches 121, 125, and 129. The bilateral switch 121 has a control input 122, a tone input 123, and a tone output 124. A signal on the control input 122 will effectively connect the tone input 123 and the tone output 124, so that a tone at the input 123 will appear on the output 124. The bilateral switch 125 has a control input 126, a tone input 127, and a tone output 128; the bilateral switch 129 has a control input 130, a tone input 131, and a tone output 132. Both bilateral switches 125 and 129 operate similarly to the bilateral switch 121. The switching apparatus 120 also has a terminal 133 to which a B+ supply voltage is connected and a terminal 134 which is connected to ground potential. An example of an electronic switching apparatus 120 which could be used is sold by Solid State Scientific, Inc. under the number SCL4016A and entitled "CMOS Quad Bilateral Switch." Further details of the switching apparatus 120 are schematically illustrated in FIG. 5. This particular device has a fourth bilateral switch which is not shown in FIG. 3B, but is available if an additional tone is to be transmitted. The number of switches necessary corresponds to the number of tones to be transmitted. In the embodiment being described, one reference tone followed by two control tones is to be transmitted, so that three bilateral switches are required.

The conductor 103 is connected to the control input 122 of the first bilateral switch 121, the conductor 108 is connected to the control input 126 of the second bilateral switch 125, and the conductor 109 is connected to the control input 130 of the third bilateral switch 129. The pulse on the conductor 103 will "close" the switch 121 to couple the tone input 123 to the output 124 for the duration of that pulse. Similarly, the bilateral switch 125 will be closed for the duration of the pulse on the conductor 108, and the bilateral switch will thereafter be closed for the duration of the pulse on the conductor 109. Since the pulse on the conductor 103, in the particular embodiment being described, has three times the duration of the pulses on the conductors 108 and 109, the bilateral switch 121 will be closed for a duration of three units of time. Then the bilateral switch 125 will be closed for one unit of time, and, thereafter, the bilateral switch 129 will be closed for one unit of time.

The tone input 123 is coupled to a reference tone oscillator 140. The oscillator 140 includes an NPN transistor 141 having its emitter coupled through a resistor 142 to ground reference potential, the base of the transistor 141 being coupled through a resistor 143 to ground reference potential and by a resistor 144 to the B+ supply voltage. A pair of serially connected capacitors 145 and 146 is coupled in parallel with an inductor 147, the parallel combination being coupled between the collector of the transistor 141 and the B+ supply voltage. The juncture of the capacitors 145 and 146 is coupled to the emitter of the transistor 141. A temperature-compensation diode is connected between the base of the transistor 141 and ground reference potential. The frequency of the tone produced by the oscillator 140 is determined by the values of the capacitors 145 and 146 and the inductor 147. The tone is coupled to an operational amplifier 149 signified by the "+" and "—" inputs, which amplifier has a bias resistor 150 coupled from one input of the amplifier 149 to the B+ supply voltage and a resistor 151 coupling such input to the juncture of the capacitors 145 and 146. There is also provided a load resistor 152 and a negative-feedback resistor 153 connected as indicated. Thus, at the output of the amplifier 149 there appears an amplified tone which constitutes the reference tone as will be described.

The tone input 127 of the second bilateral switch 125 is coupled to a variable-frequency, control tone oscillator 160 which includes an NPN transistor 161 having its emitter coupled through a resistor 162 to ground reference potential, the base of the transistor 161 being coupled through a resistor 163 to ground reference potential and a resistor 164 coupled to the B+ supply voltage. A pair of serially connected capacitors 165 and 166 is coupled in parallel with an inductor 167, the parallel combination being coupled between the collector of the transistor 161 and the B+ supply voltage. The juncture of the capacitors 165 and 166 is coupled to the emitter of the transistor 161. The inductor 167 has ten taps which are connected respectively to ten stationary contacts of a rotary switch 168 having a movable contact connected to the B+ supply voltage.

The movable arm of the switch 168 may be moved to engage a selected contact thereof, whereupon a path is completed from the B+ supply voltage through the portion of the conductor between the selected top and "bottom" portion of the inductor 167. The frequency of the tone will be determined fundamentally by the values of the selected portion of the inductor 167 and the capacitors 165 and 166. Thus, the oscillator 160 can be adjusted to produce a tone having one of ten different frequencies. The tone which appears on the emitter of the transistor 161 is coupled to an operational amplifier 169 by way of a resistor 171. The amplifier is biased by a resistor 170, and has a negative-feedback resistor 174. A load for the amplifier 169 is furnished by the resistors 172 and 173 coupled between the B+ supply voltage and ground reference potential.

There is provided a second control tone oscillator 180 which has a construction identical to the oscillator 160, except that the part values may differ. In the interest of brevity, further details of the oscillator 180 will not be described, except to note that corresponding parts are marked with corresponding reference numerals, but with twenty added thereto. In one construction, the operational amplifiers 149, 169 and 189 came in the same package, made by National Semiconductor Corp., No. LM3900.

The control tone oscillators 160 and 180 are coupled to the tone sequence switch 190, which constitutes a double pole, double throw switch. In the position illustrated, the tone from the oscillator 160 is coupled to the tone input 127 of the bilateral switch 125, and the tone from the tone oscillator 180 is coupled to the tone input 131 of the bilateral switch 129. By reversing the polarity of the switch 190, the tone from the oscillator 160 will be coupled to the bilateral switch 129, and the tone from the oscillator 180 will be coupled to the bilateral switch 125.

The three tone outputs 124, 128, and 132 of the electronic switching apparatus 120 are coupled together and to an amplifier 200. The amplifier 200 includes a PNP transistor 201 having its emitter coupled to ground reference potential and its base coupled through a resistor 202 and a capacitor 203 to the outputs of the electronic switching apparatus 120. A load resistor 204 is coupled between the collector and the B+ supply voltage, a pair of serially connected resistors 205 and 206 being coupled between the collector of the transistor 201 and its base, for biasing purposes. A decoupling capacitor 207 is coupled between the junction of the resistors 205 and 206 and ground reference potential. The collector of the transistor 201 is coupled by means of a capacitor 209 to a potentiometer 210, the movable arm of the potentiometer 210 being coupled to the audio amplifier 21 (FIG. 1).

Summarizing the operation of the elements depicted in FIG. 3B, the bilateral switch 121 is "closed" for the duration of the pulse on the conductor 103, whereby it transmits from its input 122 to its output 124 a reference tone produced by the reference tone oscillator 140. A pulse on the conductor 108 follows immediately the pulse on the conductor 103, and closes the bilateral switch 125 to couple the control tone produced by the tone oscillator 160 from the tone input 127 to the tone output 128. Immediately following the pulse on the conductor 108, there appears on the conductor 109 a pulse to close the bilateral switch 129 and couple the control tone from the control tone oscillator 180 to the output 132. Accordingly, there is applied to the amplifier 200 a sequence of tones consisting of a reference tone followed by a first control tone followed by a second control tone. In the specific embodiment being described, the reference tone has a duration three times the durations of the two control tones by virtue of the manner in which the sequential pulse generator 90 is connected, as previously described.

The durations of the tones may be modified by changing the frequency of the oscillatory signal produced by the clock oscillator 80. For example, increasing that frequency would result in shorter pulses being applied to the sequential pulse generator 90 and therefore control tones with shorter durations. The relative durations of the tones may be adjusted by varying the connections of the outputs of the sequential pulse generator 90 to the electronic switching apparatus 120. For example, if it were desired to have a reference tone twice the duration of the control tones, only two of the pulses (rather than three) would be combined to operate the first bilateral switch 121.

Although the instant system comtemplates a fixed reference tone, that is, the same reference tone is transmitted each and every time a code is transmitted, that need not be the case, and the reference tone may be selected in the same way the control tones are selected.

In use, suppose the operator wishes to reach receiver number 12. He will set the switch 168 to a position corresponding to the "1" digit and set the switch 188 so that it is set at the "2" digit position. The oscillators 160 and 180 will produce the corresponding control tones. Thereafter, the operator actuates the key 50 and thereby causes the encoder 40 to produce a sequence of a reference tone, followed by the selected first control tone, followed by the selected second control tone. During transmission of the tones, the indicator 110 will alert the operator that the tones are being transmitted and he must wait until the lamp 113 is extinguished before he can speak.

While the particular embodiment illustrates the reference tone as being transmitted first followed by two control tones, the reference tone can be last in the sequence or it can fall in the middle of a number of control tones. For example, in a six tone sequence, three control tones could be transmitted followed by the reference tone followed by a second sequence of three control tones. Details of this latter possibility will be explored hereinafter.

Figure 6:
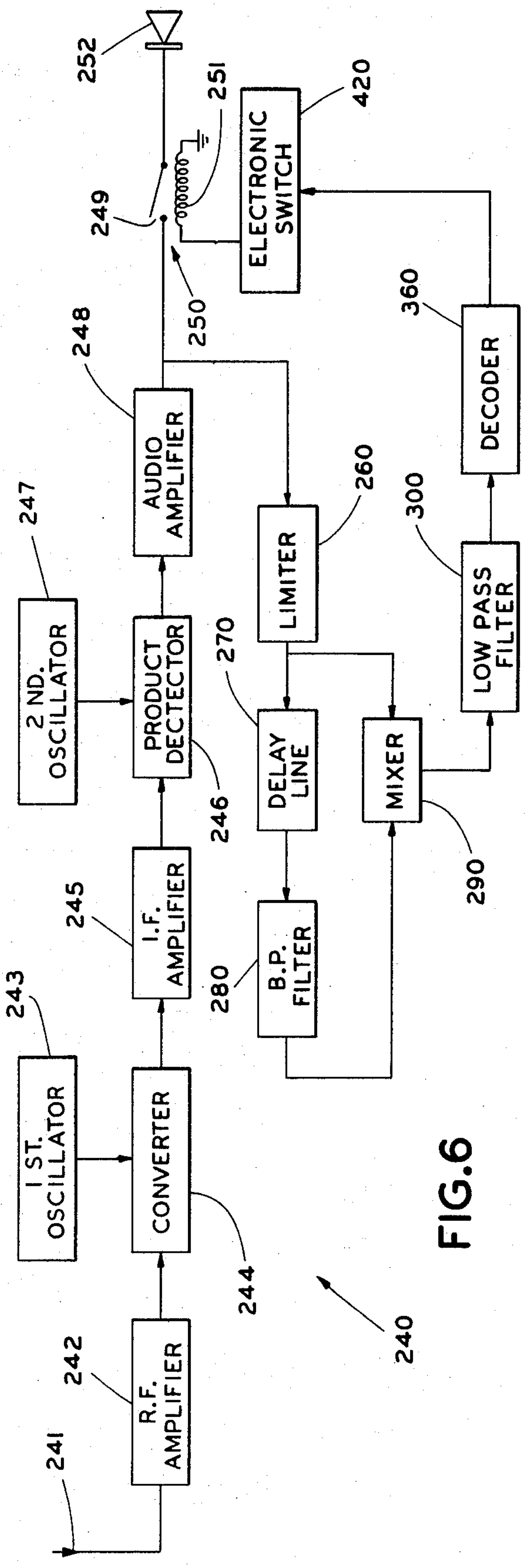
FIG. 6 is a block diagram of a receiver used in the selective call communication system.

Turning now to FIG. 6, there will be described the details of construction of the receiver used in the communication system incorporating the features of the present invention. The receiver 240 includes an antenna 241 which receives the signals emitted by the transmitter 20 and applies them to an RF amplifier 242. The amplified signals are applied to a converter 244 having a second input coupled to a first oscillator 243. The RF signals from the amplifier 242 are mixed with an oscillatory signal from the first oscillator 243 to provide an IF signal which is then applied to an IF amplifier 245. The output of the amplifier 245 is coupled to a product detector 246, the latter receiving a second input from a second oscillator 247. The second oscillator 247 reinserts the carrier which was suppressed at the transmitter 20 to detect the modulation components. The input to the audio amplifier 248 will consist of a sequence of tones followed by a voice message. The audio signals are coupled via the contacts 249 of a relay 250 (which has an energizing winding 251) to a loud speaker 252. If the contacts 249 are open, no audio signal will arrive at the speaker 252, and, accordingly, no noise or information not directed to a listener will be emitted therefrom.

The audio amplifier 148 is also coupled to a limiter 260 which increases the amplitude of the audio signal from the amplifier 248 to a given value, so that the output is substantially constant in amplitude; i.e., the audio signal is clipped. The sequence of tones, after having been clipped or limited in the limiter 260, is applied to a delay line 270, which delays the sequence of tones for a predetermined time interval. The delayed sequence of tones is applied to a band-pass filter 280 having a center frequency substantially equal to the frequency of the reference tone, so that only the reference tone, among the sequence of tones from the delay line 270, is applied to one input of a mixer 290. The other input to the mixer 290 is the undelayed sequence of tone from the limiter 260. The delay furnished by the delay line 270 is sufficient to cause the reference tone from the band-pass filter 280 to be in time coincidence with the control tones in the undelayed sequence tones. The output of the mixer 290 consists of a sequence of low-frequency mixed signals. The output of the mixer 290 also includes signals at other frequencies. The low-frequency mixed signals have frequencies equal to the difference between the frequencies of the control tones, respectively, and the frequency of the reference tone. For example, if the sequence of tones from the limiter 260 included a reference tone at 1,000 Hz. followed by a 800 Hz. control tone followed by a 600 Hz. control tone, the low-frequency mixed signals would consist of a first signal having a frequency of 200 Hz. (1,000 - 800) followed by a second signal having a frequency of 400 Hz. (1,000 - 600).

The output of the mixer 290 is applied to a low-pass filter 300 which has a cut-off frequency greater than any low-frequency mixed signals which may be generated by the mixer 290, but less than any high-frequency mixed signals which may be generated by the mixer 290. Thus, the low-pass filter 300 passes only the low-frequency mixed signals. The low-pass filter 300 is coupled to a decoder 360 which will provide an output if the sequence of the signals applied thereto correspond to the frequencies to which the decoder 360 is tuned. The output of the decoder 360 is applied to an electronic switch 420 which, in the presence of an enabling signal from the decoder 360, will furnish current through the winding 251 of the relay 250, so as to close the contacts 249. Audio signals thereafter produced by the amplifier 248 are then coupled to the speaker 252 which converts them into sound waves.

Figure 7:
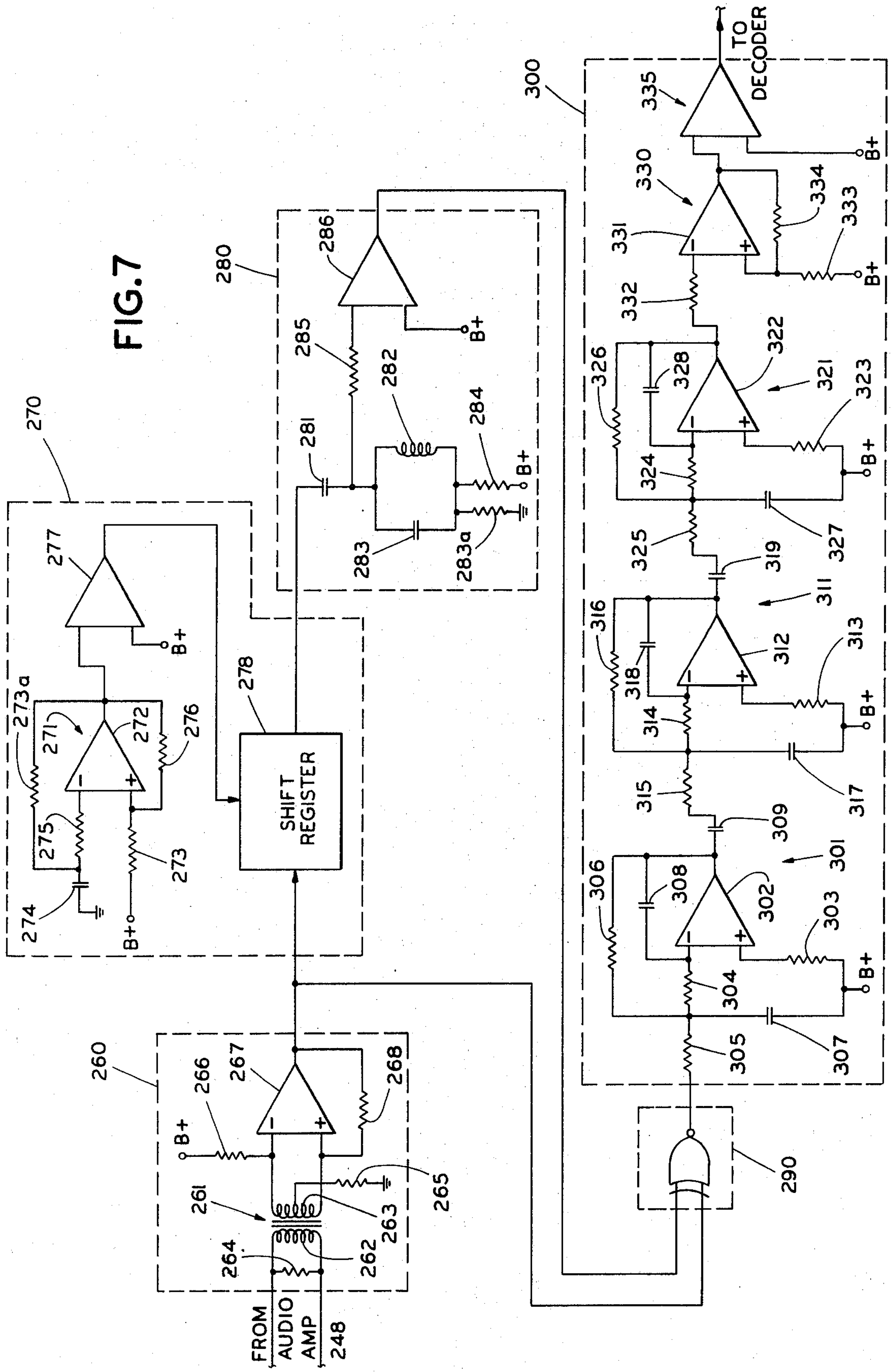
FIG. 7 is a more detailed diagram, partially in block and partially in schematic, of certain elements in the receiver of FIG. 6, including the limiter, delay line, band-pass filter, mixer, and low-pass filter.

Turning now to FIG. 7, further details of certain elements in the receiver 240 will be described. The limiter 260 includes a transformer 261 which has a primary winding 262 coupled to the audio amplifier 248, and also has a secondary winding 263. A resistor 264 coupled across the primary winding 262 provides a load for the audio amplifier 248 when the loudspeaker 252 is disconnected by virtue of the contacts 249 being open. A resistor 265, coupled between the center tap of the secondary winding 263 and ground, together with a resistor 266 coupled to the B+ supply voltage, furnishes biasing for an operational amplifier 267. A feed-back resistor 268 provides positive feedback to clip the signal applied to the limiter 260 and thereby provide an output of constant amplitude.

The delay line 270 includes a square wave generator 271 which includes an operational amplifier 272 (note the "+" and "−" inputs) biased by a resistor 273 coupled to the B+ supply voltage. A resistor 273*a* provides positive feed-back for the amplifier 272. The frequency of the pulses produced by the square wave generator 271 is controlled by a capacitor 274 and resistors 275 and 276. The square wave is amplified and improved in shape by an amplifier 277. The square wave is applied as an input to a shift register 278, which acts like a memory device, the other input of which is coupled from the limiter 260. A shift register sold by Signetics under the number 2533 and entitled "1,024- Bit Static Shift Register" has been found to be satisfactory for this purpose. The delay furnished by the delay line 270 is equal to the length of the shift register, measured in "bits," divided by the frequency of the square wave applied thereto. Thus, a shift register having a length of 1,024 bits and controlled by a square wave having a frequency of 5,816 Hz., will produce a delay of 176 milliseconds. Although delay is shown to be accomplished by a digital delay line, an analog delay line could be used. In such case, an analog signal could be applied to the delay line.

The delayed sequence of tones is aplied to a band-pass filter 280, which filter 280 includes a capacitor 281 coupled in series with the parallel combination of an inductor 282 and a capacitor 283. Such parallel combination is also coupled to a voltage divider, including a resistor 283*a* coupled to ground, and a resistor 284 coupled to the B+ supply voltage. The center frequency of the band-pass filter 280 is determined by the series resonance of the capacitor 281 and the effective inductance of the inductor 282 and the capacitor 283. Such center frequency is selected to be substantially equal to the reference frequency produced by the transmitter 20. Of the delayed tones out of the delay line 270, only the reference tone is passed by the band-pass filter 280. The band-pass filter 280 reduces the frequency spectrum of signals applied to succeeding stages so as to reduce substantially the amount of noise which would be applied thereto. Accordingly, the band-pass filter 280 improves the signal-to-noise ratio of the receiver 240. Also, the band-pass filter 280 reduces phase jitter caused by the shift register 278 being operated by a relatively low-frequency square wave.

The mixer 290 has a pair of inputs, one of which is coupled to the output of the band-pass filter 280 and the other of which is coupled to the output of the limiter 260. Thus, the mixer 290 receives from the limiter 260 a reference tone followed by a sequence of control tones. The delay furnished by the delay line 270 is selected to cause the delayed reference tone to be in time coincidence with the control tones in the undelayed sequence. It is to be noted that the mixer 290 provides a useful output only when tones are simultaneously applied to both inputs. The output during those times when neither input receives a signal is the result of noise. As previously described, the mixer 290 produces high-frequency mixed signals and low-frequency mixed signals. It is to be understood that an Exclusive-Or gate as a mixer is representative, and that other circuits capable of detecting a frequency difference can be employed. The mixer 290 may be an Exclusive-Or gate, such as in manufactured and sold by Solid State Scientific, Inc. under the designation SCL4030A, and entitled "CMOS Quad Exclusive-Or Gate." This particular device has four Exclusive-Or gates, one of which is used as the mixer 290 and the other three of which are used respectively as the amplifiers 277 and 286 and the shaper 335. They are converted to the latter purposes merely by coupling one of each of their inputs to the B+ supply voltage as illustrated.

The mixed signals are coupled to the low-pass filter 300 including three stages 301, 311 and 321 of filtering and amplification. The stage 301 includes an operational amplifier 302, resistors 303–306, and capacitors 307 and 308. The first stage 301 is coupled to the second stage 311 by a coupling capacitor 309. The stages 311 and 321 are substantially identical to the stage 301, and, in the interest of brevity, further details will not be described, except to note that corresponding parts are labeled with corresponding reference numerals, but with ten added thereto in respect to the stage 311, and twenty added thereto in respect to the stage 321. In one embodiment, each stage furnished about 40 decibels per decade roll off, with the cut-off frequency being set to about 1,800 Hz. on each.

The filter 300 includes a Schmitt trigger 330 having an operational amplifier 331 with its input coupled by way of a resistor 332 to the stage 321. In one form, the operational amplifiers 267, 272, 302, 312, 322 and 331 were stages of two LM3900 units, previously referred to. A resistor 333 coupled to the B+ supply voltage provides biasing for the amplifier 331. Positive feedback is furnished by a resistor 334. The Schmitt trigger 330 converts the low-frequency mixed signals having a ripple determined by the high-frequency mixed signals into a square wave with no high-frequency ripple. The square wave shaper 335 is an amplifier biased into limiting to remove the spikes which occur at the leading edge of each square wave.

Figures 8, 9, 10, 11:
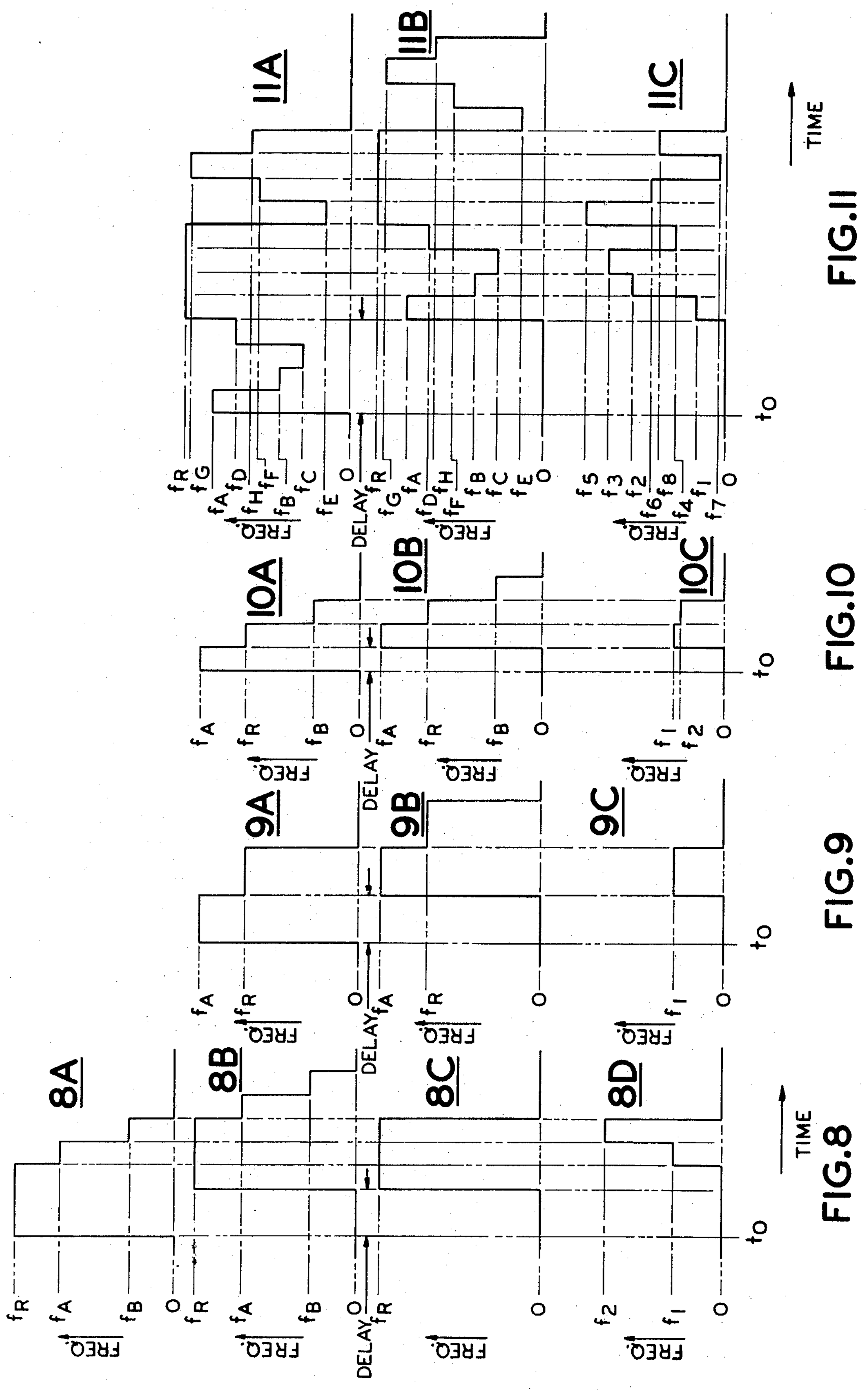
FIG. 8 depicts frequency-time representations of the outputs of various elements in the blocks of FIG. 7.
FIG. 9 depicts frequency-time representations of a second embodiment of the selective call communication system.
FIG. 10 depicts frequency-time representations of a third embodiment of the selective call communication system.
FIG. 11 depicts frequency-time representations of a fourth embodiment of the selective call communication system.

Turning now to FIG. 8, there are illustrated frequency-time diagrams pertinent to the operation of the circuits illustrated in FIG. 7. The diagram 8A represents the output of the limiter 260. At time $t_o$ the reference tone commences which is labeled "$f_R$". Immediately following $f_R$ is a first control tone $f_A$ after which appears the second control tone $f_B$. The three tones correspond to the sequence of tones transmitted by the transmitter 20. They also have durations corresponding to the exemplary durations previously noted, that is, the reference tone $f_R$ has duration three times the durations of the control tones $f_A$ and $f_B$.

The diagram 8B illustrates the output of the delay line 270, that is, the sequence of tones delayed a predetermined time interval. In the particular embodiment, the parameters of the square wave generator 271 and the shift register 278 are selected to delay the sequence for an interval equal approximately to the combined durations of the control tones $f_A$ and $f_B$. The diagram 8C represents the output of the band-pass filter which output is only the delayed reference tone which is passed by the band-pass filter 280. It is to be noted that the delayed reference tone as represented by the diagram 8C is in time coincidence with the two control tones $f_A$ and $f_B$. The reference tone represented by the diagram 8C, and the sequence of tones represented by the diagram 8A are mixed in the mixer 290 to provide a sequence of high-frequency mixed signals and a sequence of low-frequency mixed signals. The low-pass filter 300 does not allow the sequence of high-frequency mixed signals to pass, and therefore that sequence is not shown. The diagram 8D represents the sequence of low-frequency mixed signals $f_1$ and $f_2$. The frequency of the first signal $f_1$ is equal to the difference between the frequencies of the reference tone $f_R$ and the first control tone $f_A$. The frequency of the second signal $f_2$ is equal to the difference between the frequencies of the reference tone $f_R$ the second control tone $f_B$. The frequency of the mixed signal is sometimes referred to herein as being "representative" of the difference, which means the difference frequency itself or harmonics thereof. (e.g., halved or doubled). Sometimes such difference is expressed as the reference frequency "minus" the control frequency; it is to be understood that the absolute value of such difference is contemplated. The sequence of tones $f_1$, $f_2$ is applied to the Schmitt trigger and then to the shaper 335. The sequence of tone $f_1$ and $f_2$ is applied to the decoder 360.

In one operational example of the system illustrated in FIGS. 1 to 7 and represented by the diagrams of FIG. 8, the transmitter 20 produced a reference tone at a frequency of 2,150 Hz., the oscillator 160 produced control tones in the range of frequencies 650 Hz. to 1,050 Hz., and the oscillator 180 produced control tones within the range of 1,258 Hz. to 1,497 Hz. The frequency of the signal produced by the clock oscillator 80 was about 11.36 Hz., whereby each pulse therefrom had a duration of 88 milliseconds. The duration of the reference tone was 264 milliseconds and the duration of the second control tone was 88 milliseconds. In the receiver 240, the shift register 278 had a length of 1,024 bits, and the frequency of the square wave produced by the square wave generator 271 was 5,816 Hz. Thus, the delay furnished by the delay line was 176 milliseconds. The center frequency of the band-pass filter 280 was about 2,150 Hz. and the cut-off frequency of the low-pass filter 300 was about 1,900 Hz.

Although the duration of the reference tone $f_R$ is shown to be three times the duration of each of the control tones $f_A$ or $f_B$, such is not required. The reference tone has a duration preferably at least equal to the combined durations of the control tones so that the delayed reference tone is in time coincidence with the entirety of both control tones. It is desirable that the duration of the reference tone exceed the combined durations of the control tones to compensate for variation which occur. However, the reference tone could have a shorter duration, depending upon the time required to activate the decoder 360. There could be any number of control tones $f_A, f_B \ldots f_X$. The reference tone must be long enough, so that when delayed, it will be in time coincidence with at least a portion of each control tone in the undelayed sequence. The amount of overlap of the delayed reference tone with the undelayed control tones is determined by the duration of signal necessary to activate the decoder 360. For example, in the case of four or more control tones, the duration of the reference tone must be greater than the combined durations of the second control tone $f_B$ through the second-to-last control tone $f_{x+1}$.

While the delay in the embodiment illustrated is equal to the combined durations of the two control tones, that is not required. such time interval must be greater than the duration of the first control tone $f_A$ and less than the combined durations of the reference tone $f_R$ and the first control tone $f_A$. This will insure that the delayed reference tone will be in time coincidence with at least a portion of both control tones $f_A$ and $f_B$. In order to insure that the entirety of both control tones $f_A$ and $f_B$ is in time coincidence with the reference tone $f_R$, the delay would be at least the combined durations of the control tones $f_A$ and $f_B$ and no more than the duration of the reference tone $f_R$.

In a sequence of at least four control tones preceded by reference tone, that is, $f_R, f_A, f_B, \ldots f_x$, the time interval must be less than the combined durations of the reference tone $f_R$ and the first control tone $f_A$, and more than the combined durations of the first control tone $f_A$ through the second to last control tone $f_{x+1}$.

Although the reference tone occurs prior to the sequence of control tones in FIG. 8, the reference tone could occur at the end of the sequence of control tones. For example, in FIG. 9, a single control tone $f_A$ is followed by a reference tone $f_R$. A delay equal to the duration of the control tone causes the delayed control tone to be in time coincidence with the reference tone. In this example, instead of being coupled in the channel with the delay line, the band-pass filter would be coupled in the channel without the delay line. In other words, referring to FIG. 6, the delayed sequence out of the relay line 270 would be coupled directly to the mixer 290, and the undelayed sequence out of the limiter 260 would be coupled to the mixer 290 through a band-pass filter tuned to the reference frequency. In that case, only the reference tone $f_R$ of the undelayed sequence shown in Diagram 9A and the entire delayed sequence shown in Diagram 9B would be applied to the mixer 290. The output of the mixer 290 would include high-frequency mixed signals having frequencies greater than the frequencies of the tones $f_R$ and $f_A$. Such output would also include a low-frequency mixed signal $f_1$ shown in Diagram 9C having a frequency equal to the difference between the frequencies of $f_A$ and $f_R$. In this form, a single signal $f_1$ is furnished by the low-pass filter 300, whereas, in the form illustrated in FIG. 8, the low-pass filter 300 furnished a sequence of signals. Whether the reference tone occurs at the end of the sequence or at the beginning, any number of control tones may be employed.

It is to be understood that, although it is desirable to have a band-pass filter in the "$f_R$" channel to provide an improved signal-to-noise ratio, that is not a necessity.

Reference is made to FIG. 10 which depicts diagrams corresponding to a third embodiment of the invention. Specifically, diagram 10A depicts a sequence of tones commencing with a control tone $f_A$, followed by a reference tone $f_R$, followed by a second control tone $f_B$. In this embodiment, both control tones and the reference tone have the same durations. The diagram 10A represents the output of the limiter 260. The sequence is delayed a predetermined time interval, which in the embodiment illustrated is equal to the duration of any of the tones. In this particular embodiment, the band-pass filter 280 is not utilized. Instead, the delayed sequence of tones represented by the diagram 10B is coupled directly to one input of the mixer 290, the other input receiving the undelayed sequence of tones represented by the diagram 10A.

It will be noted that the reference tone $f_R$ of the undelayed sequence is in time coincidence with the delayed first control tone $f_A$, and the delayed reference tone $f_R$ is in time coincidence with the undelayed second control tone $f_B$.

In the manner previously described, the mixer 290 generates a sequence of high-frequency mixed signals and a sequence of low-frequency mixed signals. Since the low-pass filter 300 passes only the low-frequency mixed signals, the high-frequency mixed signals will be ignored.

The low-frequency mixed signals are represented by the diagram 10C and include a first signal $f_1$ having a frequency equal to the difference between the frequencies of the first control tone $f_A$ and the reference tone $f_R$, followed by a second signal $f_2$ having a frequency equal to the difference between the frequencies of the reference tone $f_R$ and the second control tone $f_B$.

Thus there is applied to the decoder 360 a sequence of signals $f_1$ and $f_2$. If the decoder 360 is tuned to respond to such signals, it will produce an output which will activate the electronic switch 420 in the manner previously described.

The duration of the reference tone $f_R$ must be equal to or greater than the durations of the control tones $f_A$ or $f_B$ and the delay must be substantially equal to the duration of the reference tone, to insure that the reference tone of the undelayed sequence of tones will be in time coincidence with a control tone in the delayed sequence of tones; and the reference tone in the delayed sequence of tones is in time coincidence with the other control tone in the undelayed sequence of tones.

Referring now to FIG. 11, a further embodiment of the present invention will be described. As in the case of the embodiment represented by FIG. 10, no band-pass filter is utilized in the embodiment of FIG. 11. Diagram 11A represents the output of the limiter 260 and includes a sequence of four control tones $f_A$-$f_D$, followed by a reference tone $f_R$ followed by a second sequence of control tone $f_E$-$f_H$. In this embodiment the duration of each of the eight control tones is the same and the duration of the reference tone is equal to the combined duration of the first sequence of control tones $f_A$-$f_D$ and also to the combined durations of the second set of control tones $f_B$-$f_H$. The signal represented by the diagram 11A is coupled directly to the mixer 290. It is also coupled to the delay line 270 which delays the signal a time interval substantially equal to the duration of the reference tone. The delayed signal is represented by the diagram 11B and is coupled as a second input to the mixer 290.

It will be noted that the reference tone of the undelayed sequence of tones is in time coincidence with the delayed first sequence of control tones $f_A$-$f_B$, and the delayed reference tone is in time coincidence with the undelayed second sequence of control tones $f_E$-$f_H$.

In the manner previously described, the mixer 290 generates a sequence of high-frequency mixed signals and a sequence of low-frequency mixed signals. Since the low-pass filter 300 passes only the low-frequency mixed signals, the high-frequency mixed signals will be ignored.

The low-frequency mixed signals are represented by the diagram 11C and include a first signal $f_1$ having a frequency equal to the difference between the frequencies of the reference tone $f_R$, and the first control tone $f_A$, followed by a second signal $f_2$ having a frequency equal to the difference between the frequencies of the reference tone $f_R$ and the second control tone $f_B$, and so forth. The last signal $f_8$ has a frequency to the difference between teh frequencies of the last control tone $f_H$ and the reference tone $f_R$.

Thus, there is applied to the decoder 360 a sequence of signals $f_1, f_2 \ldots f_8$. The decoder 360 will be modified so that it responds to a sequence of eight signals rather than the two to which the decoder 360 illustrated in FIG. 12 responds. If such a modified decoder is tuned to respond to the sequence of signals $f_1, f_2, \ldots f_8$, it will produce an output which will activate the electronic switch 420 in the manner previously described.

Some pertinent observations may be made as to the diagrams of FIGS. 8 to 11. The reference tone may be placed at the beginning of the sequence or at the end of the sequence or at the middle of the sequence. When the reference tone appears at either end, only the reference tone in one of the sequences (the delayed sequence for the reference tone appearing at the beginning of the sequence, and the undelayed sequence when the reference tone appears at the end of the sequence) is used. However when the reference tone appears in the middle of the sequence, it is used by the mixer both in the undelayed sequence and in the delayed sequence.

It is also pointed out that where the reference tone appears at the end of the sequence, the number of signals in the sequence derived from the mixer can be as few as one or as many as desired. The tone sequence must include a reference tone plus one control tone for every signal out of the mixer desired. In the case of a reference tone appearing in the middle of the sequence of tones, the number of signals in the sequence out of the mixer will again be equal to the number of control tones in the sequence.

It is important to note that the transmitter which generates the reference tone and the control tone can be used with standard selective call receivers which are responsive to a sequence of tones. Such receivers would simply ignore the reference tone. Moreover, the instant invention can be utilized in a hybrid type system where some receivers are responsive to the reference tone and others are not.

Whereas the previous discussion refers specifically to select call communication systems, it should also be realized that the same principles can be applied to digital data transmission. For example, suppose it is desired to send to a piece of terminal equipment a signal consisting of a sequence of alternating first and second tones. In that case, a signal may be transmitted, consisting of the first and second tone, but with the duration of each first tone halved, for example, the durations of the second tones being correspondingly increased to maintain the spacing between commencement of the first tones constant. In the receiver, the signal is delayed by an amount equal to the duration of the first tone. When the undelayed tones are combined with the delayed tones, the intended signal will have been reproduced. It is to be understood that a variety of alternatives is feasable, by simply controlling the duration of the tones in the transmitted signal and the amount of delay furnished by the receiver. In the case of data transmission, the "reference tone" is one tone in the transmitted sequence and the control tones are other tones in that sequence.

Figure 12:
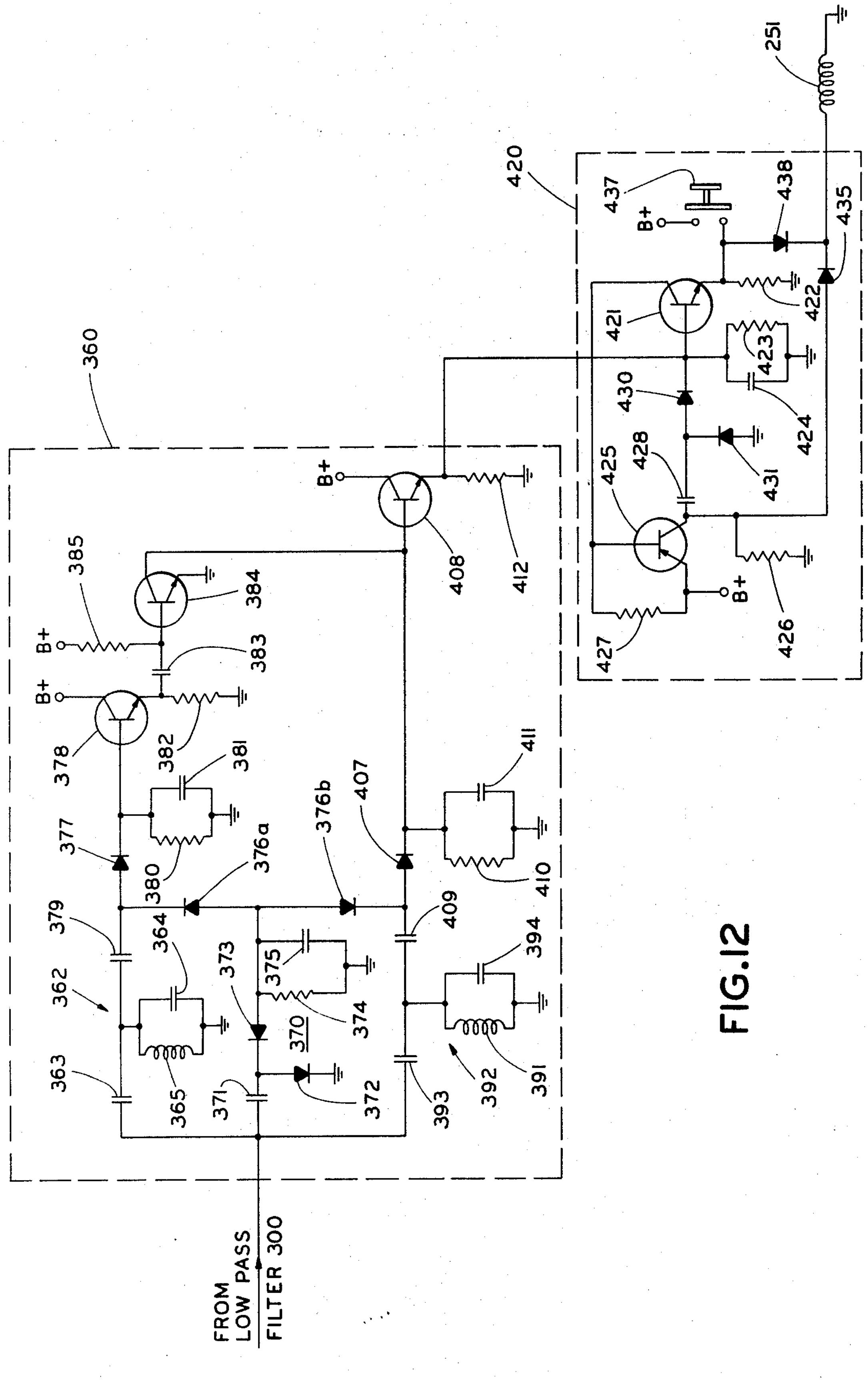
FIG. 12 is a schematic diagram of the decoder and the electronic switch of the receiver of FIG. 6.

Turning now to FIG. 12, the details of the decoder 360 will be described. Such decoder responds to a sequence of two signals, although it could be modified to respond to a single signal (FIG. 9) or a sequence of eight signals (FIG. 11), or any number desired. The decoder 360 includes a signal filter 362, which signal filter has a capacitor 363 coupled in series with the parallel combination of an inductor 365 and a capacitor 364. the decoder 360 further comprises a reference circuit 370 coupled to the low-pass filter 300 by an input capacitor 371. The reference circuit 370 includes a rectification network defined by a pair of serially connected diodes 372 and 373, the junction of which is coupled to the capacitor 371. A filtering network comprises a resistor 374 and a capacitor 375 coupled in parallel to ground. There is also provided a rectifying circuit including a pair of diodes 376*a* and 377 coupled in series to the base of a switching transistor 378. A capacitor 379 is coupled between the junction of the capacitors 363 and 364 and the junction of the diodes 376a and 377. There is also provided a resistor 380 and a capacitor 381 for filtering of the rectified voltage. The transistor 378 is connected as an emitter follower, the emitter being coupled to a load resistor 382 connected to ground reference potential. The emitter of the transistor 378 is coupled by way of a capacitor 383 to an NPN transistor 384, the emitter of which is grounded and the base of which is coupled to the B+ supply voltage by way of a biasing resistor 385.

There is also provided a second filter circuit 392 which includes a capacitor 393 coupled in series with the parallel combination of an inductor 391 and a capacitor 394. A diode 376b is coupled in series with a diode 407 to the base of a switching transistor 408, to furnish rectification of the signal which is coupled thereto from the second filter circuit 392 by a capacitor 409. There is also provided a resistor 410 and a capacitor 411 for filtering of the rectified voltage. The transistor 408 is connected as an emitter follower, the emitter being coupled to a load resistor 412 connected to ground reference potential, the collector being coupled to the B+ supply voltage. The base of the transistor 408 is also coupled back to the collector of the transistor 384.

Prior to reception of any signals, the transistor 384 is conducting by virtue of the forward bias provided by the current flow through the resistor 385. Thus, the base of the transistor 408 is effectively grounded and is therefore nonconductive.

The sequence of signals $f_1, f_2$ from the low-pass filter 300, which also contains noise, will be filtered in the reference circuit 370 and will be rectified thereby to provide a reference voltage on the anode of the diode 376a. If the first signal $f_1$ has a frequency the same as that to which the filter 362 is tuned, the filter 362 will develop its maximum voltage which is applied to the cathode of the diode 376*a*. In order that the diode 376*a* may conduct to provide an output, the tone appearing at the cathode thereof must have a peak-to-peak value in excess of the reference voltage on the anode of the diode 376*a* . The rectified voltage, after being filtered by the resistor 380 and the capacitor 381, is applied to the base of the transistor 378 so as to render it conductive. Current flows from the B+ supply through the collector and the emitter of the transistor 378, through the capacitor 383 and the base-emitter junction of the transistor 384. Since the transistor 384 is already conducting, the presence of the signal has little effect. When the first signal $f_1$ terminates, the capacitor 383 discharges through the resistor 382 to render nonconductive the transistor 384, thereby removing the short on the base of the transistor 408. The length of time the transistor 384 is nonconductive, and, therefore, the length of time the short is removed from the transistor 408 is determined by the time constant of the resistor 382 and the capacitor 383 and the resistor 385. However, until the correct second signal $f_2$ is received, the transistor 408 is not rendered conductive.

When the first signal $f_1$ terminates, the second signal $f_2$ commences and if the frequency thereof is the frequency to which the filter 392 is tuned, the filter 392 will develop its maximum voltage which is applied via the capacitor 409 to the cathode of the diode 376*b*. In order to provide an output from the diode 407, the signal appearing at the cathode of the diode 376*b* must have peak-to-peak value in excess of the reference voltage on the anode of the diode 376*b*. The signal is rectified by the diodes 376*b* and 407 which, in effect, constitute a doubler circuit and filtered by the resistor 410 and the capacitor 411. If the short on the base of the transistor 408 furnished by the transistor 384 has been removed, then the rectified voltage renders the transistor 408 conductive to cause an output signal to appear on the emitter of the transistor 408. If desired, a feedback network may be provided from the transistor 408 to the transistor 384 to maintain the latter nonconductive for the duration of the second signal $f_2$. Alternatively, the time constant determined by the resistor 382 and the capacitor 383 and resistor 385 may be selected to insure that the transistor 384 is not conductive throughout the duration of the second signal.

There is provided an electronic switch 420, which, in the embodiment shown, is a monostable multivibrator and includes an NPN transistor 421 having its emitter coupled to ground via a resistor 422 and having its base coupled to ground by way of a resistor 423 and a capacitor 424 coupled in parallel. There is also provided a PNP transistor 425 having its base connected directly to the collector of the transistor 421, its collector connected through a resistor 426 to ground and its emitter connected to the source of supply voltage, a resistor 427 being connected between the base and the emitter of the transistor 425. The collector of the transistor 425 is coupled by way of a capacitor 428 and a diode 430 to the base of the transistor 421. A diode 431 is coupled between ground reference potential and the junction of the capacitor 428 and the diode 430. The emitter of the transistor 408 in the decoder 360 is coupled to the base of the transistor 421. A diode 435 couples the collector of the transistor 425 to the relay winding 251. There is provided a switch 437 coupled between the source of B+ supply voltage and the emitter of the transistor 421. The switch 437 is also coupled via a diode 438 to the cathode of the diode 435.

In operation, the appearance of the output signal on the emitter of the transistor 408 causes conduction of the transistor 421 which provides a path for current flow from the source of supply voltage through the base-emitter junction of the transistor 425 and the collector and the emitter of the transistor 421. This renders the transistor 425 highly conductive so as to provide current flow through its collector and its emitter and the resistor 426 and thereby cause conduction of the diode 435 to place the supply voltage on the conductor 436. The supply voltage becomes an enabling signal for causing current flow in the winding 251 of the relay 250 to close the contacts 249. The capacitor 424 must be charged before the transistor 421 will conduct. Thus, the capacitor 424 introduces a slight delay to prevent the electronic switch 420 from producing the enabling signal in the presence of the transient charge. The isolating diode 430 prevents the signal from the decoder 360 from being applied to the capacitor 428. The diode 431 provides a rapid discharge path for the capacitor 428.

During the conduction period of the transistors 421 and 425, current flows from B+ through the collector and the emitter of the transistor 425, through the capacitor 428 and through the base-emitter junction of the transistor 421 to charge the capacitor 428. Accordingly, when the signal from the decoder 360 is removed by virtue of the tones terminating, the transistor 421 remains conductive because the capacitor 428 has a charge thereon, which charge leaks off through the base-emitter junction of the transistor 421 and the resistors 422 and 423. Of course, the conduction of the transistor 421 maintains the transistor 425 conductive to maintain enabling current through the winding 251 for a time interval determined by the RC time constant of the switch circuit 420, that is, the resistors 422 and 423 and the capacitor 428. By selecting the value of those parts, the duration of the enabling current may be controlled.

With the relay 250 energized, audio signals from the audio amplifier 248 will be applied to the loud speaker 252 for conversions into sound waves. It is thus desirable that the RC time constant in the electronic switch circuit 420 be selected to be long enough to maintain the contacts 249 closed for the duration of audio information. The switch 437 is provided to enable the user to "override" the timing function by rendering nonconductive the transistors 421 and 425. The B+ supply voltage is then directly applied through the diode 438 to energize the relay winding 251, whereby the contacts 249 will remain closed as long as the switch 437 is energized.

It is believed that the invention, its mode of construction and assembly, and many of its advantages should be readily understood from the foregoing without further description, and it should also be manifest that, while preferred embodiments of the invention have been shown and described for illustrative purposes, the structural details are, nevertheless, capable of wide variation within the purview of the invention, as defined in the appended claims.

What is claimed is:

1. A communication receiver for receiving incoming signals including a sequence of a reference tone and at least one control tone, said receiver comprising a processing circuit for receiving the incoming signals and providing an undelayed sequence of tones, delay means coupled to said processing circuit for providing a delayed sequence of tones, the delay being such as to cause the reference tone in one sequence to be in time coincidence with at least a portion of the one control tone in the other sequence, mixing means having two inputs respectively coupled to said processing circuit and to said delay means for mixing the undelayed sequence and the delayed sequence, whereby said mixing means provides at least one low-frequency mixed signal having a frequency representative of the difference between the frequencies of the reference tone and the one control tone, and utilization means coupled to said mixing means for using the mixed signal.

2. The communication receiver set forth in claim 1, for receiving a sequence of a reference tone and a single control tone, said mixing means providing a single low-frequency mixed signal with a frequency equal to the difference between the frequencies of the reference tone and the single control tone.

3. The communication receiver set forth in claim 1, for receiving a sequence of a reference tone and a plurality of control tones, said mixing means providing a sequence of low-frequency mixed signals corresponding in number to the number of control tones, the frequencies of the low-frequency mixed signals being respectively equal to the frequencies of the control tones minus the frequency of the reference tone.

4. The communication receiver as set forth in claim 1, wherein said delay means includes a shift register and a clock coupled thereto.

5. The communication receiver set forth in claim 1, wherein said mixing means includes an Exclusive-Or circuit having two inputs respectively coupled to said processing circuit and to said delay means and an output coupled to said utilization means.

6. The communication receiver set forth in claim 1, wherein said utilization means includes decoding means responsive to a mixed signal having a predetermined frequency to provide an output signal.

7. The communication receiver set forth in claim 6, wherein said decoding means includes an electronic switch to cause the output signal to be DC.

8. The communication receiver set forth in claim 1, and further comprising limiter circuit means having an input coupled to said processing circuit and an output coupled to said delay means and to said mixing means, said limiter circuit means being operative to render substantially constant the amplitude of the processed signals applied to said delay means and to said mixing means.

9. A communication receiver for receiving incoming signals including a sequence of a reference tone and at least one control tone, said receiver comprising a processing circuit for receiving the incoming signals and providing an undelayed sequence of tones, delay means coupled to said processing circuit for providing a delayed sequence of tones, the delay being such as to cause the reference tone in one sequence to be in time coincidence with at least a portion of the one control tone in the other sequence, mixing means having two inputs respectively coupled to said processing circuit and to said delay means for mixing the undelayed sequence and the delayed sequence, whereby said mixing means provides at least one low-frequency mixed signal having a frequency representative of the difference between the frequencies of the reference tone and the one control tone, band-pass filter means tuned to pass the reference tone and not the control tone and connected in the path followed by that sequence in which the reference tone is at least partially in time coincidence with the control tone in the other sequence, and utilization means coupled to said mixing means for using the mixed signal.

10. The communication receiver set forth in claim 9, wherein said band-pass filter means is coupled in the path containing said delay means.

11. The communication receiver set forth in claim 9, wherein said band-pass filter means is coupled to the output of said delay means.

12. A communication receiver for receiving incoming signals including a sequence of a reference tone and at least one control tone, said receiver comprising a processing circuit for receiving the incoming signals and providing an undelayed sequence of tones, delay means coupled to said processing circuit for providing a delayed sequence of tones, the delay being such as to cause the reference tone in one sequence to be in time coincidence with at least a portion of the one control tone in the other sequence, mixing means having two inputs respectively coupled to said processing circuit and to said delay means for mixing the undelayed sequence and the delayed sequence, whereby said mixing means provides at least one high-frequency mixed signal and at least one low-frequency mixed signal, the high-frequency mixed signal having a frequency greater than the frequencies of the reference tone or the one control tone, the low-frequency mixed signal having a frequency equal to the difference between the frequencies of the reference tone and the one control tone, low-pass filter means coupled to said mixing means and having a cutoff frequency between the frequencies of the high- and low-frequency mixed signals so as to pass only the low-frequency mixed signal, and utilization means coupled to said low-pass filter means for using the low-frequency mixed signal.

13. The communication receiver set forth in claim 12, wherein said low-pass filter means includes amplifier means for amplifying the low-frequency mixed signal.

14. A communication receiver for receiving incoming signals including a sequence of a reference tone and at least one control tone followed by an intelligence message, said receiver comprising a processing circuit for receiving the incoming signals and providing an undelayed sequence of tones and the intelligence message, delay means coupled to said processing circuit for providing a delayed sequence of tones, the delay being such as to cause the reference tone in one sequence to be in time coincidence with at least a portion of the one control tone in the other sequence, mixing means having two inputs respectively coupled to said processing circuit and to said delay means for mixing the undelayed sequence and the delayed sequence, whereby said mixing means provides at least one low-frequency mixed signal with a frequency representative of the difference between the frequencies of the reference tone and one control tone, decoding means responsive to a mixed signal having a predetermined frequency to provide an output signal, electronic switching means coupled to said decoding means and responsive to the output signal of providing an enabling signal which extends beyond termination of the delayed sequence, and an output circuit coupled to said processing circuit and including a transducer for converting the intelligence message, said output circuit being coupled to said electronic switching means and responsive to the enabling signal to furnish an output in accordance with the intelligence message and rendered inoperative in the absence of the enabling signal.

15. A communication system comprising a transmitter including means for generating a sequence of a reference tone and at least one control tone, and means for transmitting the sequence of tones; and a receiver including a processing circuit for receiving the transmitted signals and providing an undelayed sequence of tones, delay means coupled to said processing circuit for providing a delayed sequence of tones, the delay being such as to cause the reference tone in one sequence to be in time coincidence with at least a portion of the control tone in the other sequence, mixing means having two inputs respectively coupled to said processing circuit and to said delay means for mixing the undelayed sequence and the delayed sequence, whereby said mixing means provides at least one low-frequency mixed signal with a frequency representative of the difference between the frequencies of the reference tone and the control tone, and utilization means coupled to said mixing means for using at least the mixed signal.

16. The communication system set forth in claim 15, wherein said generating means generates a sequence of a reference tone and a single control tone, said mixing means providing a single low-frequency mixed signal with a frequency equal to the difference between the frequencies of the reference tone and the single control tone.

17. The communication system set forth in claim 15, wherein said generating means generates a sequence of a reference tone and a plurality of control tones, said mixing means providing a sequence of low-frequency mixed signals corresponding in number to the number of control tones, the frequencies of the low-frequency mixed signals being respectively equal to the frequencies of the control tones minus the frequency of the reference tone.

18. The communication system set forth in claim 17, wherein said reference tone precedes all of said control tones.

19. The communication system set forth in claim 17, wherein said sequence includes an even number of control tones and said reference tone falls in the middle of such sequence.

20. The communication system set forth in claim 15, wherein the durations of the reference tone and the one control tone are substantially equal.

21. The communication system set forth in claim 15, wherein said reference tone precedes said one control tone.

22. A communication system comprising a transmitter including means for generating a sequence of a first control tone followed by a reference tone followed by a second control tone, the duration of the reference tone being at least equal to the durations of the first control tone and the second control tone, means for transmitting the sequence of tones; and a receiver including a processing circuit for receiving the transmitted signals and providing an undelayed sequence of tones, delay means coupled to said processing circuit for providing a delayed sequence of tones, the delay being equal to the duration of the reference tone so as to cause the reference tone in one sequence to be in time coincidence with the first control tone in the other sequence and to cause the reference tone in the other sequence to be in time coincidence with the second control tone in the one sequence, mixing means having two inputs respectively coupled to said processing circuit and to said delay means for mixing the undelayed sequence and the delayed sequence, whereby said mixing means provides a sequence of two low-frequency mixed signals, the frequencies of the low-frequency mixed signals being respectively representative of the frequencies of the control tones minus the frequency of the reference tone, and utilization means coupled to said mixing means for using the mixed signal.

23. The communication system set forth in claim 22, wherein the duration of the first control tone is substantially equal to the duration of the second control tone.

24. The communication system set forth in claim 22, wherein the duration of the reference tone is substantially equal to the duration of the first control tone and to the duration of the second control tone.

25. The communication system set forth in claim 22, wherein each control tone has the same duration.

26. A communication system comprising a transmitter including means for generating a sequence of a first series of control tones followed by a reference tone followed by a second series of control tones, the duration of the reference tone being no less than the combined durations of the control tones in each series, and means for transmitting the sequence of tones; and a receiver including a processing circuit for receiving the transmitted signals and providing an undelayed sequence of tones, delay means coupled to said processing circuit for providing a delayed sequence of tones, the delay being equal to the duration of the reference tone so as to cause the reference tone in one sequence to be in time coincidence with at least a portion of each control tone in the other sequence and to cause the reference tone in the other sequence to be in time coincidence with at least a portion of each control tone in the one sequence, mixing means having two inputs respectively coupled to said processing circuit and to said delay means for mixing the undelayed sequence and the delayed sequence, whereby said mixing means provides a sequence of low-frequency mixed signals corresponding in number to the number of control tones, the frequencies of the low-frequency mixed signals being respectively representative of the frequencies of the control tones minus the frequency of the reference tone, and utilization means coupled to said mixing means for using the mixed signal.

27. The communication system set forth in claim 26, wherein the duration of the first sequence of control tones is substantially equal to the duration of the second sequence of control tones.

28. The communication system set forth in claim 26, wherein the duration of the reference tone is substantially equal to the duration of the first sequence of control tones and to the duration of the second sequence of control tones.

29. The communication system set forth in claim 26, wherein each control tone of the first and second sequences of control tones has substantially the same duration.

30. In a transmitter including means for generating a carrier wave, means for modulating a sequence of tones onto the carrier wave, a power supply for energizing the carrier wave generating means and the modulating means, and an encoder for generating the sequence of tones, said encoder comprising manually operable actuating means, electronic switching means coupled to said actuating means and responsive to actuation thereof to become latched on for producing an enabling signal extending indefinitely beyond release of said actuating means, the power supply being coupled to said electronic switching means and responsive to the enabling signal therefrom to produce power for energizing the carrier wave generating means and the modulating means, clock oscillator means coupled to said electronic switching means and responsive to the enabling signal therefrom for producing an oscillatory signal, a sequential switch having a control input coupled to said electronic switching means and having a plurality of tone inputs and a tone output and a reset output, said sequential switch including means responsive to an oscillatory signal on said control input sequentially to couple said tone inputs to said tone output, said sequential switch further including means responsive to the last tone input being coupled to said tone output to produce a reset signal on said reset output, said electronic switching means being coupled to said reset output and being responsive to the reset signal therefrom to interrupt said enabling signal, and a plurality of tone oscillators respectively coupled to the tone inputs of said sequential switch.

31. In the transmitter of claim 30, wherein said electronic switching means includes first and second NOR devices each having a pair of inputs and an output, the inputs of said first NOR device being respectively coupled to said manually operable actuating means and to the output of said second NOR device, the inputs of said second NOR device being coupled respectively to the output of said first NOR device and the reset output of said sequential switch, the output of said first NOR device being coupled to said clock oscillator means and the output of said second NOR device being coupled to the power supply.

32. In the transmitter of claim 30, wherein said clock oscillator means produces an oscillatory signal in the form of a series of pulses.

33. In the transmitter of claim 30, and further comprising indicator means coupled to said sequential switch and responsive to the sequential switching of said tone inputs with respect to said tone output to furnish an alerting signal.

* * * * *